United States Patent
Araki

(10) Patent No.: US 12,482,276 B2
(45) Date of Patent: Nov. 25, 2025

(54) IMAGE IDENTIFICATION DEVICE AND IMAGE IDENTIFICATION METHOD

(71) Applicant: Panasonic Intellectual Property Management Co., Ltd., Osaka (JP)

(72) Inventor: Shoichi Araki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 266 days.

(21) Appl. No.: 18/388,996

(22) Filed: Nov. 13, 2023

(65) Prior Publication Data

US 2024/0078822 A1  Mar. 7, 2024

Related U.S. Application Data

(63) Continuation of application No. PCT/JP2022/019722, filed on May 9, 2022.

(30) Foreign Application Priority Data

May 28, 2021 (JP) .................................. 2021-090460

(51) Int. Cl.
  *G06V 20/60* (2022.01)
  *G06V 10/44* (2022.01)
  *G06V 10/764* (2022.01)
  *G06V 10/774* (2022.01)

(52) U.S. Cl.
  CPC ............ *G06V 20/60* (2022.01); *G06V 10/457* (2022.01); *G06V 10/764* (2022.01); *G06V 10/774* (2022.01)

(58) Field of Classification Search
  CPC ...... G06T 7/00; G06V 10/457; G06V 10/764; G06V 10/774; G06V 10/82; G06V 20/60
  See application file for complete search history.

(56) References Cited

U.S. PATENT DOCUMENTS

2019/0347526 A1\* 11/2019 Sunkavalli ............. G06N 3/084

FOREIGN PATENT DOCUMENTS

| CN | 210334836 U | \* | 4/2020 |
|---|---|---|---|
| JP | 2014-202700 | | 10/2014 |
| JP | 6148521 | | 6/2017 |
| JP | 2018-189420 | | 11/2018 |

OTHER PUBLICATIONS

International Search Report (ISR) issued on Jun. 14, 2022 in International (PCT) Application No. PCT/JP2022/019722.

\* cited by examiner

*Primary Examiner* — Michael J Vanchy, Jr.
(74) *Attorney, Agent, or Firm* — Wenderoth, Lind & Ponack, L.L.P.

(57) ABSTRACT

An image identification device includes a first determiner that determines whether each of one or more areas in an image includes a joint between two first materials, and an identifier that identifies the type of a first material by using a first discriminative model and outputs type information indicating the type of the first material, the type of the first material being identified by the first discriminative model receiving input on an area that has been determined by the first determiner as an area without the joint between the two first materials, out of the one or more areas in the image, the first discriminative model being created on the basis of first learning images that are images of different types of materials including the first material, the first learning images being images without a joint between two first materials.

11 Claims, 7 Drawing Sheets

IMAGE IDENTIFICATION DEVICE AND IMAGE IDENTIFICATION METHOD

CROSS REFERENCE TO RELATED APPLICATIONS

This is a continuation application of PCT International Application No. PCT/JP2022/019722 filed on May 9, 2022, designating the United States of America, which is based on and claims priority of Japanese Patent Application No. 2021-090460 filed on May 28, 2021. The entire disclosures of the above-identified applications, including the specifications, drawings and claims are incorporated herein by reference in their entirety.

FIELD

The present disclosure relates to an image identification device and an image identification method.

BACKGROUND

A technique for identifying the features of a material by processing an image obtained by photographing the material is conventionally known (see Japanese Patent No. 6148521 and Japanese Unexamined Patent Application Publication No. 2018-189420, for example).

Japanese Patent No. 6148521 and Japanese Unexamined Patent Application Publication No. 2018-189420 disclose devices that identify the colors and patterns of a target object, such as a piece of cloth, a building material, a piece of furniture, an interior (an interior material), clothing, and printed matter.

CITATION LIST

Patent Literature

PTL 1: Japanese Patent No. 6148521
PTL 2: Japanese Unexamined Patent Application Publication No. 2018-189420

SUMMARY

Technical Problem

By identifying, for example, the colors and patterns of a material included in an image, conventional devices can identify the type of the material included in the image from among materials of different types, such as materials of different colors and patterns. In such devices, improvement in the accuracy of identifying a material included in an image is considered necessary.

The present disclosure provides an image identification device with improved identification accuracy, and the like.

Solution to Problem

An image identification device according to one aspect of the present disclosure includes an image obtainer that obtains an image including a first material, a setter that sets one or more areas in the image, a first determiner that determines whether each of the one or more areas in the image includes a joint between two first materials each of which is the first material, and an identifier that identifies the type of the first material by using a first discriminative model and outputs type information indicating the type of the first material, the type of the first material being identified by the first discriminative model receiving input on a first area that has been determined by the first determiner as an area without the joint between the two first materials, out of the one or more areas in the image, the first discriminative model being created based on first learning images that are images of different types of materials including the first material, the first learning images being images without a joint.

An image identification method according to another aspect of the present disclosure includes obtaining an image including a first material, setting one or more areas in the image, determining whether each of the one or more areas in the image includes a joint between two first materials each of which is the first material, and identifying the type of the first material by using a first discriminative model, and outputting type information indicating the type of the first material, the type of the first material being identified by the first discriminative model receiving input on a first area that has been determined as an area without the joint between the two first materials, out of the one or more areas in the image, the first discriminative model being created based on first learning images that are images of different types of materials including the first material, the first learning images being images without a joint.

A recording medium according to still another aspect of the present disclosure is a non-transitory computer-readable recording medium having recorded thereon a program for causing a computer to execute the image identification method.

Advantageous Effects

The present disclosure provides an image identification device with improved identification accuracy, and the like.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Overview of Present Disclosure

Figure 1:
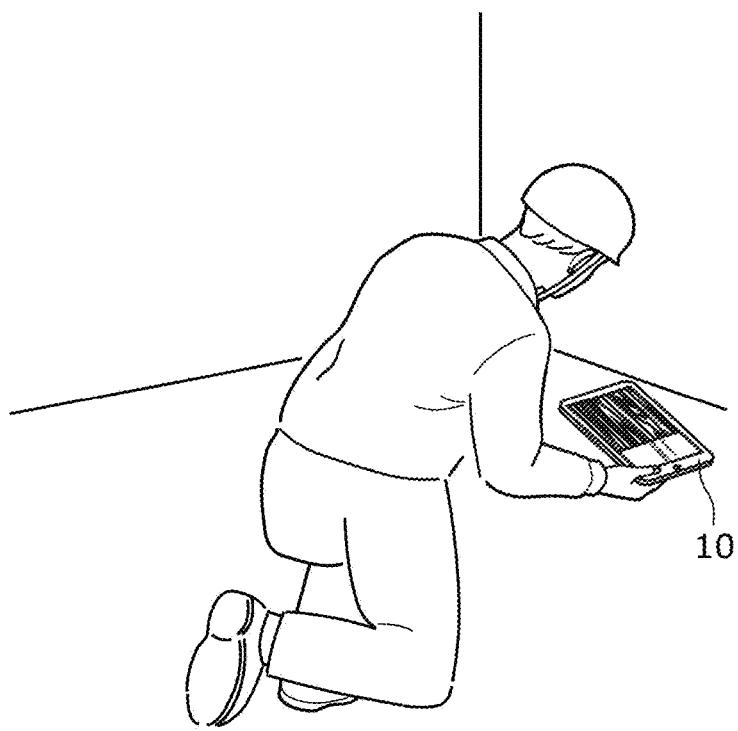
FIG. 1 is a figure for explaining an overview of an image identification device according to an embodiment.

As described above, by identifying, for example, the colors and patterns of a material included in an image, conventional devices can identify the type of the material included in the image from among materials of different types, such as materials of different colors and patterns.

For instance, the device disclosed in Japanese Patent No. 6148521 identifies whether a piece of cloth is a plain cloth or a patterned cloth, according to the amplitude of the waveform of a color value. When the piece of cloth is a plain cloth, the device further identifies whether the piece of cloth is a white plain cloth or a colored plain cloth.

In addition, for instance, the device disclosed in Japanese Unexamined Patent Application Publication No. 2018-189420 includes a shielding unit for optically shielding the surface of a target object, an illumination unit, and a photographing unit from outside. The device disclosed in Japanese Unexamined Patent Application Publication No. 2018-189420 identifies the category (type) of the surface of the target object by using statistical processing, on the basis of the amounts of features of images captured using different illumination patterns.

Incidentally, in interior materials and other materials used in a building, materials (single materials) are joined together for use. Thus, an image generated by photographing materials in a state in which the materials are joined together may be used to identify the types of the materials. In such a case, false identification may occur (that is, a false identification result may be obtained) when an image used for identifying materials (single materials) includes a joint between two or more (e.g., two) materials that is formed when the materials are joined together. That is, when an image to be processed includes a joint, the accuracy of identifying the type of a material decreases.

For instance, to identify the type of a material, a discriminative model for identifying the type of a material is used, the discriminative model being a model trained (by machine learning) using only the material (single material) images without a joint, as images (image data items) used as training data items. The above-mentioned false identification tends to occur especially when such a discriminative model is used.

Meanwhile, forcing a user to photograph a material to obtain an image without a joint, makes a device that identifies a material inconvenient for the user.

Thus, the inventor of the present application has discovered the following: even in a case where an image includes a joint, the accuracy of identifying the type of a material included in the image can be improved by using an area without a joint within the image.

An image identification device according to one aspect of the present disclosure includes an image obtainer that obtains an image including a first material, a setter that sets one or more areas in the image, a first determiner that determines whether each of the one or more areas in the image includes a joint between two first materials each of which is the first material, and an identifier that identifies the type of the first material by using a first discriminative model and outputs type information indicating the type of the first material, the type of the first material being identified by the first discriminative model receiving input on a first area that has been determined by the first determiner as an area without the joint between the two first materials, out of the one or more areas in the image, the first discriminative model being created based on first learning images that are images of different types of materials including the first material, the first learning images being images without a joint.

For instance, the image identification device further includes a second determiner that determines whether the total number of first areas that have been determined by the first determiner as areas without the joint between the two first materials, out of the one or more areas, is greater than or equal to a predetermined number. When the second determiner determines that the total number of the first areas is less than the predetermined number, the setter further sets an area that is at least partially different from each of the one or more areas, and the first determiner further determines whether the area further set by the setter includes the joint between the two first materials.

For instance, the setter further repositions a second area to a third area that is at least partially different from the second area, the second area being an area that has been determined by the first determiner as an area including the joint between the two first materials, out of the one or more areas, and the first determiner further determines whether the third area to which the second area has been repositioned by the setter includes the joint between the two first materials.

For instance, the setter repositions the second area to the third area, based on the position of the joint between the two first materials.

For instance, the setter repositions the second area to the third area by moving the second area in the direction intersecting the longitudinal direction of the joint, the second area being the area that has been determined by the first determiner as the area including the joint between the two first materials.

For instance, the first determiner determines whether the image includes the joint between the two first materials, by performing processing for detecting a straight line from the image.

For instance, the first determiner determines whether each of the one or more areas in the image includes the joint between the two first materials, by using a second discriminative model that receives input on the one or more areas and outputs joint information indicating whether each of the one or more areas includes the joint between the two first materials, the second discriminative model being created based on the first learning images and second learning images, the second learning images being images of different types of materials including the first material, and each including a joint.

For instance, the materials are interior materials installed in a building.

For instance, the image identification device further includes a display that displays an image showing the type of the first material indicated in the type information output by the identifier.

In addition, an image identification method according to another aspect of the present disclosure includes obtaining an image including a first material, setting one or more areas in the image, determining whether each of the one or more areas in the image includes a joint between two first materials each of which is the first material, and identifying the type of the first material by using a first discriminative model, and outputting type information indicating the type of the first material, the type of the first material being identified by the first discriminative model receiving input on a first area that has been determined as an area without the joint between the two first materials, out of the one or more areas in the image, the first discriminative model being created based on first learning images that are images of different types of materials including the first material, the first learning images being images without a joint.

In addition, a recording medium according to still another aspect of the present disclosure is a non-transitory computer-readable recording medium having recorded thereon a program for causing a computer to execute the image identification method.

It should be noted that general or specific aspects may be realized as a system, a method, an integrated circuit, a computer program, or a non-transitory computer-readable recording medium such as a CD-ROM, or by any given combination thereof.

An embodiment is described below with reference to the drawings. It should be noted that the embodiment below shows a general or specific example. The numerical values, shapes, materials, structural elements, the arrangement and connection of the structural elements, steps, order of the steps, and other descriptions indicated in the following embodiments are mere examples, and therefore do not intend to limit the present disclosure. Among structural elements described in the following embodiment, those not recited in any of the independent claims are described as optional structural elements.

In addition, the drawings are schematic views and are not necessarily precise illustrations. In the drawings, substantially the same structural elements are assigned the same reference symbol. Overlapping explanations may be omitted or simplified.

Embodiment

[Overview]

An overview of image identification device 10 according to an embodiment is described below. FIG. 1 is a figure for explaining an overview of image identification device 10 according to the embodiment.

Image identification device 10 is embodied as, for example, a tablet terminal and used by a user who conducts an inspection of an interior material. Here, the inspection of the interior material is an inspection of whether an interior material specified in specifications is installed.

For instance, in selling a new condominium, many options for interior materials including, for example, a floor material and wall cloth are provided to meet the various tastes of customers. Thus, before delivery of a home to a customer, it is necessary to inspect whether interior materials specified by the customer have been properly installed. Image identification device 10 is used for inspecting such interior materials.

It should be noted that the interior materials are a generic term of a finishing material and a substrate which are used in, for example, a floor, a wall, and a ceiling. The interior materials include not only finishing materials, such as flooring, a carpet, tiles, wall cloth, sheets of plywood, and coating materials which are exposed to the room interior, but also substrates under the finishing materials.

When obtaining an image of an interior material by user operation, image identification device 10 identifies whether the interior material shown (included) in the image is an interior material specified in the specifications and displays the result of identification on display 130.

Figure 2:
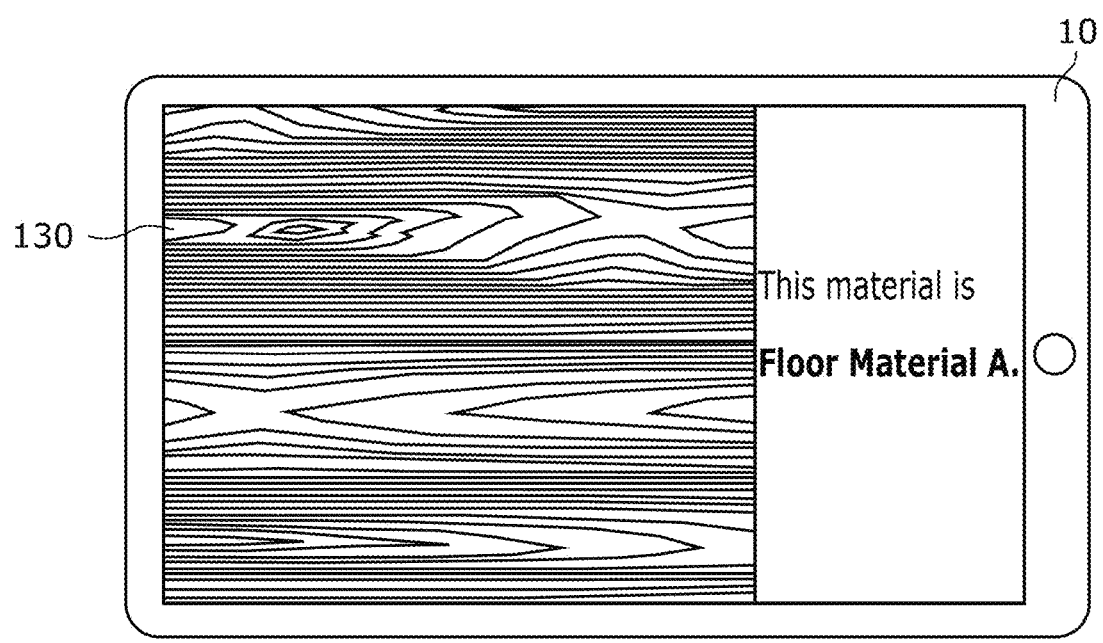
FIG. 2 illustrates an example of a display screen showing the result of identification by the image identification device according to the embodiment.

FIG. 2 illustrates an example of a display screen showing the result of identification by image identification device 10 according to the embodiment.

Image identification device 10 outputs, for example, information indicating the type of a material included in the image (type information). Floor Material A in FIG. 2 is an example of the type information and indicates that the type of the material included in the image is Floor Material A. As illustrated in FIG. 2, for instance, display 130 displays the type information (more specifically, an image showing, for example, characters indicating the type of the material indicated in the type information) and an image of the material indicated in the type information.

It should be noted that the image of the material displayed by display 130 may be an image captured by image obtainer 110 (see FIG. 3) (e.g., image 300 including joint 211, illustrated in FIG. 4) or a sample image of the material stored in storage 150 (see FIG. 3) (e.g., an image of a single material).

[Configuration]

A configuration of image identification device 10 is described.

Figure 3:
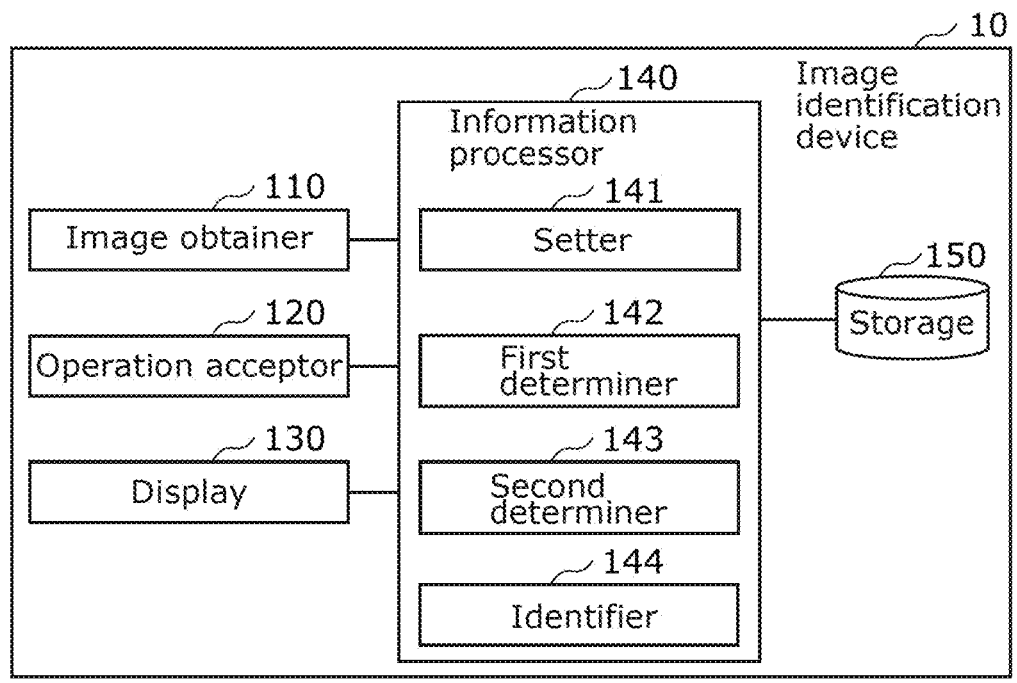
FIG. 3 is a block diagram illustrating a functional configuration of the image identification device according to the embodiment.

FIG. 3 is a block diagram illustrating a functional configuration of image identification device 10 according to the embodiment.

Image identification device 10 includes image obtainer 110, operation acceptor 120, display 130, information processor 140, and storage 150.

Image obtainer 110 obtains an image. For instance, when operation acceptor 120 accepts a photographing (image capturing) operation, image obtainer 110 obtains an image (that is, captures an image). The image obtained by image obtainer 110 includes a material (more specifically, a first material, which is described later).

The material is not limited to a particular material and may be any object such as an interior material, a building material, or a piece of furniture. In the embodiment, materials to be identified by identifier 144, which is described later, are interior materials installed in a building.

The first material is a material that is included in the image and whose type is to be identified by identifier 144, which is described later. That is, the first material is the material (subject) that is included in the image obtained by image obtainer 110 and to be identified using a discriminative model by identifier 144.

For instance, image obtainer 110 is a camera including, for example, a complementary metal oxide semiconductor (CMOS) image sensor. The image obtained by image obtainer 110 is stored in storage 150.

It should be noted that image obtainer 110 may be a communication interface that obtains an image from a camera other than image obtainer 110. Alternatively, in a case where images (image data items) are prestored in storage 150, image obtainer 110 may be a processor that obtains an image from storage 150.

Operation acceptor 120 accepts a user operation. Operation acceptor 120 is embodied as, for example, a touch panel and a hardware button.

Display 130 displays a display screen in accordance with control by information processor 140. For instance, display 130 displays an image showing the type of the material (more specifically, the first material) indicated in type information output by identifier 144. Display 130 includes, for example, a liquid crystal panel or an organic EL panel as a display device.

Information processor 140 performs various information processing tasks for identifying the type of the material (e.g., an interior material) included (shown) in the image obtained by image obtainer 110. For instance, information processor 140 performs the various information processing tasks for identifying the type of an interior material included in the image obtained by image obtainer 110. By identifying the type of the interior material included in the image obtained by image obtainer 110, information processor 140 may perform processing for identifying whether the interior material included in the image is an interior material specified in the specifications. Information processor 140 is embodied as, for example, a microcomputer and may be embodied as a processor.

Specifically, information processor 140 includes setter 141, first determiner 142, second determiner 143, and identifier 144.

Setter 141 is a processor for setting one or more areas in the image obtained by image obtainer 110.

Figure 4:
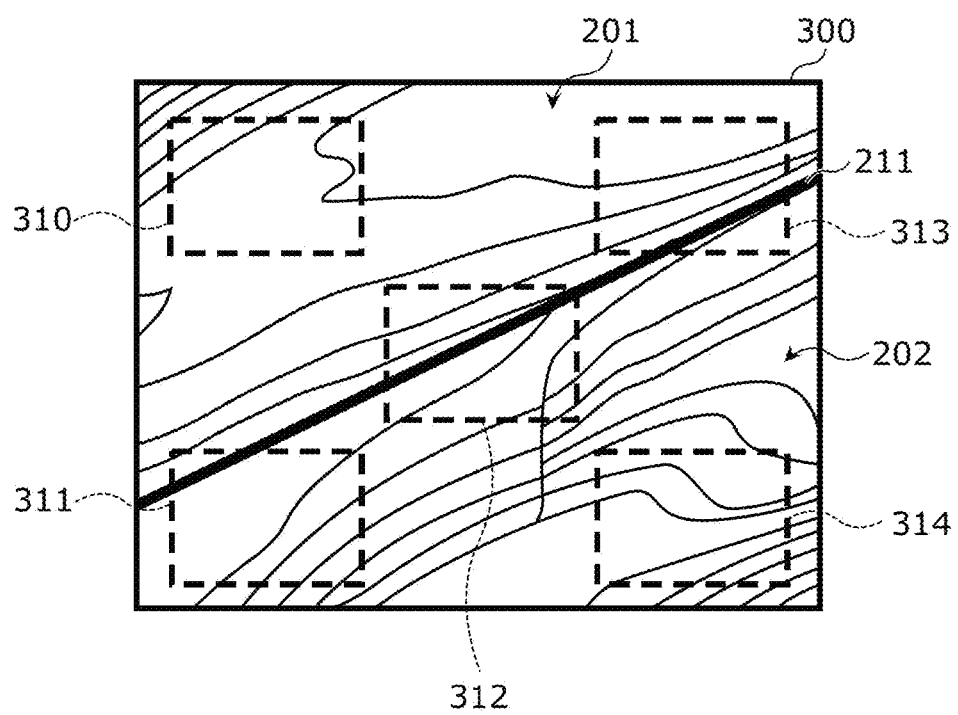
FIG. 4 illustrates an example of an image obtained by the image identification device according to the embodiment and examples of areas set by the image identification device.

FIG. 4 illustrates an example of an image obtained by image identification device 10 according to the embodiment and examples of areas set by image identification device 10.

For instance, image obtainer 110 obtains image 300. In this case, for instance, setter 141 sets one or more areas in image 300. In the example illustrated in FIG. 4, setter 141 sets area 310, area 311, area 312, area 313, and area 314.

It should be noted that an area size may be preset to any size and is not limited to a particular size. For instance, an area may be a portion of the image or the whole image.

Although the area is rectangular in the embodiment, the area may be square or circular and is not limited to a particular shape.

In addition, each area may have the same size and shape or a different size and shape.

In the embodiment, setter 141 sets the five areas. However, as long as one or more areas are set, the number of areas set by setter 141 may be one or at least two.

In addition, setter 141 may set an area in any portion of the image or set two or more areas by diving the whole image into areas. Alternatively, setter 141 may set the whole image as one area.

In addition, setter 141 may set an area at any position of the image. For instance, setter 141 may set an area at a predetermined position of the image, on the basis of coordinate information indicating a position, stored in storage 150. Setter 141 may generate random numbers, determine coordinates on the basis of the generated random numbers, and set an area on the basis of the determined coordinates.

In addition, setter 141 may set areas so that each area overlaps or does not overlap another area among the areas.

Setter 141 sets an area having a predetermined size and shape at a predetermined position in the image obtained by image obtainer 110.

It should be noted that in the descriptions below, a portion surrounded by the outline of an area in an image is referred to as a partial image or simply referred to as an area.

First determiner 142 is a processor that determines whether each of the one or more areas that setter 141 has set in the image obtained by image obtainer 110 (that is, each of partial images) includes a joint between two first materials. That is, first determiner 142 determines whether the joint is included in each of the portions surrounded by the outlines of the areas set in the image.

A joint between two materials is a portion between the two materials. Although a joint is, for example, a gap between materials, the joint may be a portion where the materials are in contact with one another or, for example, resin which is positioned between the materials and used for splicing the materials together. In addition, the materials forming the joint may be the same type or different types of materials. That is, first materials forming a joint may be the same type or different types of materials.

For instance, a joint between two materials is a joint positioned between the two materials. Alternatively, a joint may be a joint at the position of a portion surrounded by three or more materials.

Figure 5:
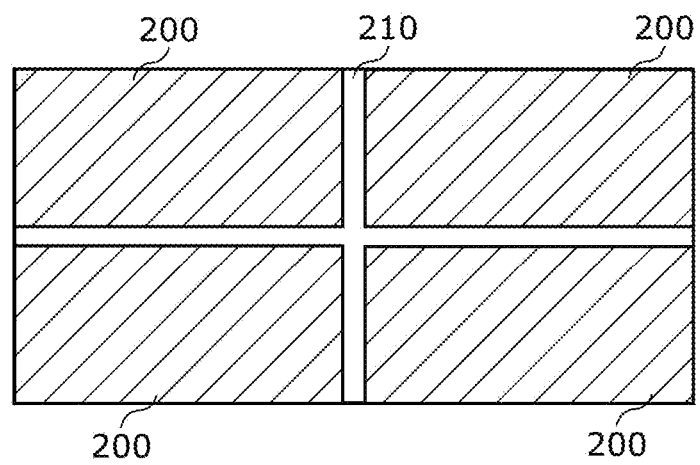
FIG. 5 is a figure for explaining a joint between two materials according to the embodiment.

FIG. 5 is a figure for explaining a joint between two materials 200 according to the embodiment. It should be noted that in FIG. 5, a hatch pattern is provided in materials 200 for the sake of explanation.

As illustrated in FIG. 5, when for instance materials 200 are interior materials, materials 200 (single materials) in FIG. 5 are joined together for use. Thus, joint 210 is formed between two materials 200.

For instance, in image 300 in FIG. 4, joint 211 is between woodgrain material 201 and woodgrain material 202 (each of which is an example of the first material). For instance, first determiner 142 determines that area 310 and area 314 do not include joint 211. Meanwhile, for instance, first determiner 142 determines that areas 311, 312, and 313 include joint 211.

For instance, setter 141 further repositions an area (also referred to as a second area) that has been determined by first determiner 142 as an area including a joint between two or more first materials to an area that is at least partially different from the area determined as the area including the joint.

Figure 6:
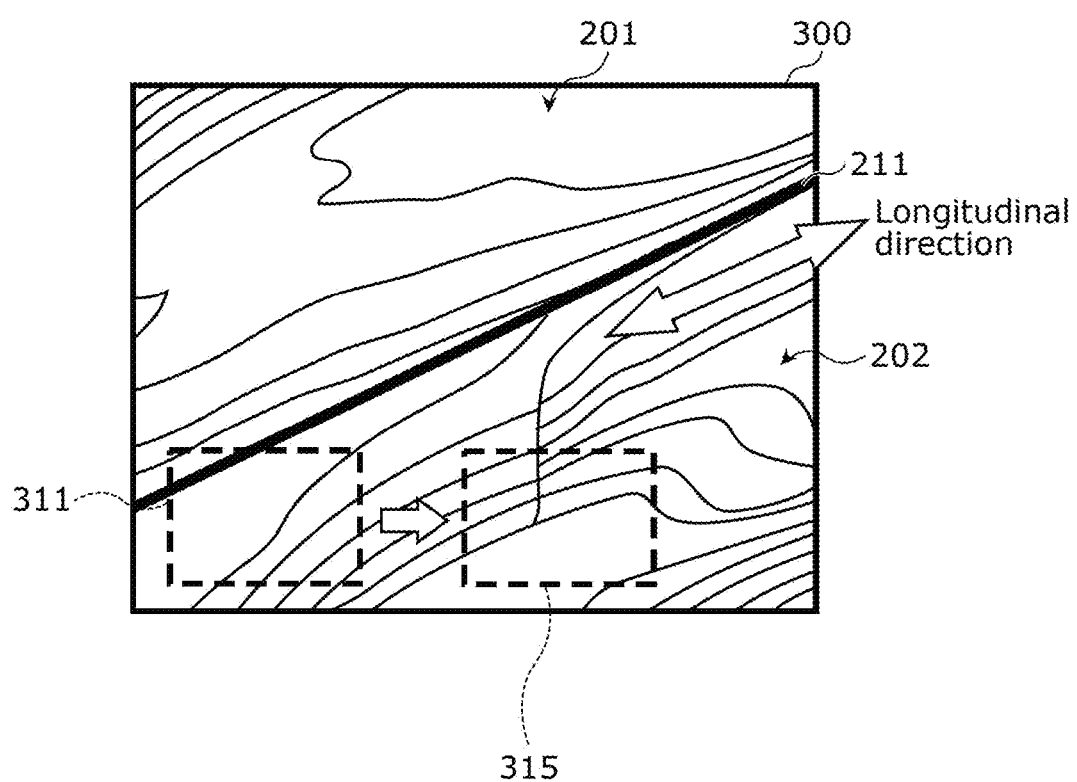
FIG. 6 is a figure for explaining area repositioning processing by the image identification device according to the embodiment.

FIG. 6 is a figure for explaining area repositioning processing by image identification device 10 according to the embodiment.

For instance, as illustrated in FIG. 6, area 311 includes joint 211. In this case, first determiner 142 determines that area 311 (i.e., a partial image showing area 311) includes joint 211 between two materials 201 and 202. In this case, setter 141 repositions area 311. For instance, setter 141 repositions area 311 by moving area 311 to area 315.

For instance, first determiner 142 further determines whether the area (also referred to as a third area) to which the area has been repositioned by setter 141 includes the joint between the two or more first materials. In the example illustrated in FIG. 6, first determiner 142 determines that area 315 does not include joint 211 between materials 201 and 202.

It should be noted that in the repositioning processing (the area repositioning processing) described above, the position of the area may be set to any position. For instance, setter 141 may reposition the area to a predetermined position in the image, on the basis of the coordinate information indicating the position, stored in storage 150. Setter 141 may generate random numbers, determine coordinates on the basis of the generated random numbers, and reposition the area on the basis of the determined coordinates.

Alternatively, in the above repositioning processing, setter 141 may reposition the area on the basis of the position of the joint between the two first materials.

For instance, by using, for example, line detection or edge detection, setter 141 detects the position of the joint in the area that has been determined by first determiner 142 as an area including the joint or the position of the joint in the whole image. On the basis of the result of detection, setter 141 further repositions the area to an area without a joint, within the image. Alternatively, for instance, setter 141 may reposition the area on the basis of the position of the joint, by setting an area that does not overlap the area that has been determined by first determiner 142 as the area including the joint.

Alternatively, in the above repositioning processing, setter 141 may reposition the area by moving, in the direction intersecting the longitudinal direction of the joint, the area that has been determined by first determiner 142 as the area including the joint between the two first materials.

For instance, joints tend to be straight lines (linear) in interior materials and other materials installed in a building. Thus, moving an area including a joint in the direction intersecting the longitudinal direction of the joint facilitates setting an area without the joint.

It should be noted that by performing given processing, first determiner 142 may determine whether an image (more specifically, a partial image showing an area set by setter 141) includes a joint.

For instance, as described above, joints in interior materials and other materials installed in a building tend to be straight lines. Thus, by performing processing for detecting a straight line from an image, first determiner 142 may determine whether the image includes the joint between the two first materials.

Alternatively, for instance, first determiner 142 may determine whether each area set by setter 141 includes the joint, by using a discriminative model (a second discriminative model) trained by machine learning. That is, for instance, first determiner 142 determines whether a partial image showing an area set by setter 141 includes the joint, by using the trained second discriminative model. For instance, first determiner 142 determines whether each of the one or more areas set in the image by setter 141 includes the joint between the two first materials, by using the second discriminative model that receives input on the one or more areas and outputs joint information indicating whether each of the one or more areas includes the joint between the two first materials, the second discriminative model being created on the basis of the first learning images and second learning images, the second learning images being learning images of different types of materials including the first material, and each including a joint between two materials.

The second discriminative model is a machine learning model for determining whether an image includes a joint. Specifically, the second discriminative model is a machine learning model trained using, as training data items, the first learning images, the second learning images, and the joint information for learning, the second learning images being the images of different types of materials including the first material, and each including a joint between two materials, the joint information for learning indicating whether each of the first learning images and the second learning images includes the joint between the two materials.

The first learning images are the images of the materials. Specifically, the first learning images are images of different types of materials including the first material, and each do not include a joint between two materials.

The second learning images are the images of the materials. Specifically, the second learning images are images of different types of materials including the first material, and each include a joint between two materials.

It should be noted that one learning image (each of the first learning images and the second learning images) may include just one material or may include two or more materials.

The joint information for learning indicates whether each of the first learning images and the second learning images includes a joint between two materials.

As described above, the second discriminative model is an inference model (a discriminative model) trained by machine learning using, as training data items, the first learning images, the second learning images, and the joint information for learning, which is labeled training data (annotation information).

Second determiner 143 is a processor that determines whether the number of areas (also referred to as first areas) that have been determined by first determiner 142 as areas without a joint between two or more first materials, out of the one or more areas, is greater than or equal to a predetermined number. When for instance second determiner 143 determines that the number of the areas is less than the predetermined number, setter 141 further sets an area that is at least partially different from each of the one or more set areas. In this case, for instance, first determiner 142 further determines whether the image of the area further set by setter 141 includes the joint between the first materials.

It should be noted that setter 141 may set one area at one time or may set two or more areas at one time. For instance, area setting processing by setter 141, joint inclusion/non-inclusion determination processing by first determiner 142, and total-area-number determination processing by second determiner 143 may be repeatedly performed in the order named.

In addition, the number of areas set by setter 141 may be greater than, equal to, or less than the predetermined number.

The predetermined number may be one or at least two and is not limited to a particular number.

Information indicating the predetermined number (total-area-number information) is, for example, prestored in storage 150.

Identifier 144 is a processor that identifies the type of the first material included in the image, by using a first discriminative model and outputs type information indicating the identified type. Specifically, by using the first discriminative model, identifier 144 identifies the type of the first material included in an area that has been determined by first determiner 142 as an area without the joint between the two first materials. More specifically, identifier 144 identifies the type of the first material by using the first discriminative model and outputs type information indicating the type of the first material, the type of the first material being identified by the first discriminative model receiving input on the area (a partial image) that has been determined by first determiner 142 as an area without the joint between the two first materials, out of the one or more areas set in the image by setter 141, the first discriminative model being created on the basis of first learning images that are images of different types of materials including the first material, and each do not include a joint between two materials. That is, by using the trained first discriminative model, identifier 144 identifies the type of the first material shown in an image (image data) obtained by image obtainer 110 (more specifically, one or more partial images showing one or more set areas), on the basis of the obtained image and the one or more areas set by setter 141 (area information indicating the one or more set areas).

For instance, as illustrated in FIG. 4, consider a case in which setter 141 sets five areas 310 to 314 and first determiner 142 determines that areas 310 and 314 are areas without joint 211, out of five areas 310 to 314. In this case, on the basis of two areas 310 and 314 in image 300 (that is, a partial image showing area 310 and a partial image showing area 314), identifier 144 identifies the types of materials 201 and 202 included in image 300 by using the first discriminative model, and outputs type information indicating the results of identification.

The first discriminative model is a machine learning model that identifies the type of a material included in an image. Specifically, the first discriminative model is a machine learning model trained using, as training data items, first learning images and type information for learning, the first learning images being images of different types of materials including the first material, and not including a joint between two materials, the type information for learning indicating the type of a material included in each of the first learning images.

The type information for learning indicates the type of a material included in each of the first learning images.

As described above, the first discriminative model is an inference model trained by machine learning using, as training data items, the first learning images and the type information for learning, which is labeled training data (annotation information).

Each of the materials is any object such as the above-mentioned interior material, a building material, or a piece of furniture. The types of the materials may be identified by identifier 144.

The type of a material identified by identifier 144 is information identifying the material and is for example, the predetermined item number or item name of the material. That is, the type information indicates, for example, the item number or item name of a material.

When for instance the types of the materials include item name Floor Material A, item name Floor Material B, and item name Floor Material C, the first learning images include an image including a material (item name: Floor Material A) and not including a joint where two materials (Floor Material A) are joined together (e.g., an image including one material (Floor Material A)), an image including a material (item name: Floor Material B) and not including a joint where two materials (Floor Material B) are joined together (e.g., an image including one material (Floor Material B)), and an image including a material (item name: Floor Material C) and not including a joint where two materials (Floor Material C) are joined together (e.g., an image including one material (Floor Material C)). For instance, the type information for learning includes information indicating the position (e.g., coordinate information) of the material (Floor Material A) within the image including the material (Floor Material A), information indicating the position (e.g., coordinate information) of the material (Floor Material B) within the image including the material (Floor Material B), and information indicating the position (e.g., coordinate information) of the material (Floor Material C) within the image including the material (Floor Material C).

It should be noted that as the type of a material, identifier 144 may identify, for example, the properties of the material, such as wood or resin, the shape of the material, such as a square or a rectangular, and the pattern of the material, such as the grain of wood or a check pattern.

When materials 201 and 202 are the same material (for example, when it is predetermined that an image obtained by image obtainer 110 includes only one type of material), identifier 144 may identify the type of the first material included in image 300, on the basis of the result of identifying the type of the material included in area 310 and the result of identifying the type of the material included in area 314.

Identifier 144 identifies (comprehensively determines) the type of the first material on the basis of classification scores obtained by partial images being input, and outputs type information indicating the identified type.

As illustrated in FIG. 4, when areas 310 to 314 are set, for instance, identifier 144 obtains, using the first discriminative model, the result of identifying the type of the material included in area 310 and the result of identifying the type of the material included in area 314. The first discriminative model outputs probability information (classification scores) indicating which one of the materials is the most likely material.

When for instance the types of the materials include Floor Material A, Floor Material B, and Floor Material C, the first discriminative model outputs classification scores indicating the type of the material included in area 310, in association with information items indicating the types of materials. For example, the classification scores are output in the forms of Floor Material A:0.7, Floor Material B:0.2, and Floor Material C:0.1. Likewise, first discriminative model outputs classification scores indicating the type of the material included in area 314, for example, in the forms of Floor Material A:0.8, Floor Material B:0.1, and Floor Material C:0.1.

For instance, identifier 144 identifies, as the type of the first material, the type of material having the highest score among the classification scores obtained by the partial images of the image being input, and outputs information indicating the identified type, as the type information. In the above example, the highest classification score indicating the type of the material included in area 310 is Floor Material A, and the highest classification score indicating the type of the material included in the partial image showing area 314 is Floor Material A. Thus, identifier 144 identifies the type of the first material as Floor Material A by majority decision. For instance, identifier 144 outputs the information indicating Floor Material A as the type information to display 130. Thus, as illustrated in FIG. 2, display 130 displays, for instance, Floor Material A.

Alternatively, identifier 144 may identify the type of the first material on the basis of the mean values of the classification scores obtained by the partial images being input, and output information indicating the identified type, as the type information. In the above example, for instance, the mean value of classification scores for Floor Material A is 0.75, the mean value of classification scores for Floor Material B is 0.15, and the mean value of classification scores for Floor Material C is 0.1. Thus, identifier 144 identifies the type of the first material as Floor Material A.

Alternatively, identifier 144 may identify the type of the first material on the basis of the multiplication values of the classification scores obtained by the partial images being input, and output information indicating the identified type, as the type information. In the above example, for instance, the multiplication value of the classification scores for Floor Material A is 0.56, the multiplication value of the classification scores for Floor Material B is 0.02, and the multiplication value of the classification scores for Floor Material C is 0.01. Thus, identifier 144 identifies the type of the first material as Floor Material A.

It should be noted that identifier 144 may output the information (e.g., classification scores) output from the first discriminative model, as the type information.

In addition, the first discriminative model may identify the type of the first material on the basis of the classification scores obtained by areas in an image being input, as identifier 144 performs the above processing, and output the type information as information indicating the identified type.

The discriminative models (the first discriminative model and the second discriminative model described above) are machine learning models using a neural network (e.g., convolutional neural network (CNN)) such as deep learning. However, the discriminative models may be other machine learning models.

The discriminative models are prestored in, for example, storage 150.

It should be noted that to store a discriminative model means to store information such as network parameters and arithmetic algorithm (machine learning algorithm) in the discriminative model. The algorithm may be a given algorithm.

Storage 150 is a storage device used for storing a program to be executed for information processor 140 to perform information processing and information necessary for the information processing. Storage 150 is embodied as, for example, a hard disk drive and semiconductor memory. Information items stored in storage 150 are, for example, a control program to be executed by each processor, the first discriminative model, the second discriminative model, images, and the total-area-number information.

It should be noted that image identification device 10 may further include a condition obtainer that obtains photographing (image capturing) conditions when image obtainer 110 obtains an image. The photographing conditions include, for example, the distance from image obtainer 110 to the first material as a subject, the orientation of image obtainer 110 (image identification device 10), zooming settings of image obtainer 110, and brightness around the subject. Specifically, the orientation of image obtainer 110 is, for example, the angle of each of pan, tilt, and roll. The photographing conditions obtained by the condition obtainer are stored in association with an image in storage 150. Specifically, the condition obtainer is embodied as an element including various sensors, such as a distance sensor including, for example, a time of flight (TOF) sensor, an acceleration sensor, a gyro sensor, and a brightness sensor.

Image identification device 10 may further include a position obtainer that obtains position information on the position of image obtainer 110. The position obtained by the position obtainer is a three-dimensional position. However, the position may be a two-dimensional position. The position information includes orientation information indicating the orientation of image obtainer 110 (the direction in which image obtainer 110 faces). The position obtainer is embodied as an element including, for example, an acceleration sensor, a gyro sensor, and a global positioning system (GPS) module.

It should be noted that in machine learning performed in advance in the discriminative models, images obtained under different photographing conditions may be used as training data items. The photographing conditions include, for example, the distance, the camera orientation, the color temperature of illumination during photographing, and the position shift. Together, the image and these information items may be input to the discriminative models.

[Operation]

Operation of image identification device 10 is described below.

Figure 7:
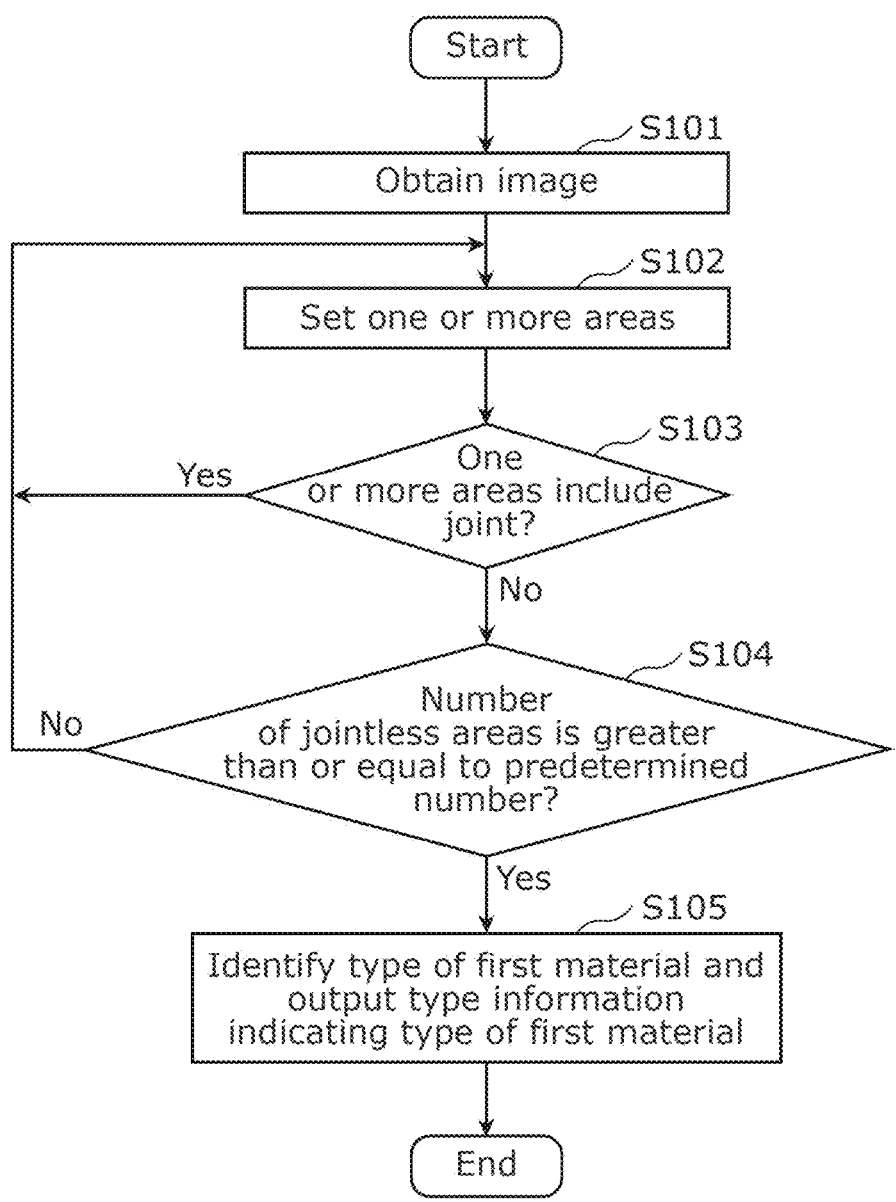
FIG. 7 is a flowchart illustrating the procedure of operation of the image identification device according to the embodiment.

FIG. 7 is a flowchart illustrating the procedure of operation of image identification device 10 according to the embodiment.

Image obtainer 110 obtains an image (S101). For instance, by capturing an image of a subject such as an interior material installed in a building, image obtainer 110 obtains (generates) the image including a first material that is the interior material. When for instance operation acceptor 120 accepts a photographing operation, image obtainer 110 obtains an image. The image obtained by image obtainer 110 is stored in, for example, storage 150.

Then, setter 141 sets one or more areas in the image obtained by image obtainer 110 (S102). In this example, for instance, setter 141 sets one area in the image obtained by image obtainer 110.

First determiner 142 determines whether a joint is included in the area set by setter 141 (that is, a partial image showing the set area) in the image obtained by image obtainer 110 (S103).

When first determiner 142 determines that the area includes the joint (Yes in S103), the processing returns to step S102. Then, setter 141 repositions the area in the image obtained by image obtainer 110.

Meanwhile, when first determiner 142 determines that the area does not include the joint (No in S103), second determiner 143 determines whether the number of areas without the joint is greater than or equal to a predetermined number (S104). That is, second determiner 143 determines whether the number of partial images without the joint is greater than or equal to the predetermined number.

When second determiner 143 determines that the number of the areas without the joint is not greater than or equal to the predetermined number (No in S104), the processing returns to step S102. Setter 141 further sets an area in the image obtained by image obtainer 110. That is, image identification device 10 continues to set an area until the number of areas without the joint is greater than or equal to the predetermined number.

Meanwhile, when second determiner 143 determines that the number of the areas without the joint is greater than or equal to the predetermined number (Yes in S104), identifier 144 identifies the type of the first material included in the image, by using the first discriminative model, and outputs type information indicating the type of the first material (S105). As a result, display 130 displays an image as illustrated in FIG. 2.

Advantageous Effects

As described above, image identification device 10 according to the embodiment includes image obtainer 110, setter 141, first determiner 142, and identifier 144. Image obtainer 110 obtains an image including a first material. Setter 141 sets one or more areas (e.g., areas 310, 311 in FIG. 6) in the image. First determiner 142 determines whether each of the one or more areas in the image includes a joint between two first materials. Identifier 144 identifies the type of the first material by using the first discriminative model and outputs type information indicating the type of the first material, the type of the first material being identified by the first discriminative model receiving input on an area that has been determined by first determiner 142 as an area without the joint between the two first materials, out of the one or more areas in the image, the first discriminative model being created on the basis of first learning images that are images of different types of materials including the first material, the first learning images being images without a joint between two materials.

If the image includes the joint, identifier 144 may falsely identify the type of the first material due to the joint. Thus, image identification device 10 uses an image (a partial image) without the joint, for identifying the type of the material. By doing so, it is possible to improve the accuracy of identifying the type of the material. Furthermore, the identification accuracy can be improved without a user paying attention to the photographing position in order not to include a joint in an image, when photographing the material. That is, the identification accuracy is improved irrespective of the photographing position at which the material is photographed by the user, which can suppress reduction in user convenience.

In addition, a large amount of data may be necessary to create a discriminative model capable of performing accurate identification even if an image includes a joint. Because of the large amount of data, it is difficult for image identification device 10 to use the discriminative model in a terminal device such as a tablet terminal. In image identification device 10 designed to use an image without a joint, the identification accuracy is improved without the discriminative model having a large amount of data.

For instance, image identification device 10 further includes second determiner 143 that determines whether the number of areas that have been determined by first determiner 142 as areas without the joint between the two first materials, out of the one or more areas, is greater than or equal to a predetermined number. When for instance second determiner 143 determines that the number of the areas is less than the predetermined number, setter 141 further sets an area that is at least partially different from each of the one or more areas. In this case, for instance, first determiner 142 further determines whether the area further set by setter 141 includes the joint between the two first materials.

Since at least the predetermined number of the images (partial images) are used for identifying the type of the material, the identification accuracy is further improved.

For instance, setter 141 further repositions the area that has been determined by first determiner 142 as an area including the joint between the two first materials to an area that is partially different from the area determined as the area including the joint. In this case, for instance, first determiner 142 further determines whether the area to which the area has been repositioned by setter 141 includes the joint between the two first materials.

This facilitates repositioning the area including the joint to the area without the joint.

For instance, in the above repositioning processing, setter 141 repositions the area on the basis of the position of the joint between the two first materials.

By, for example, setting an area without a joint, it is possible to suppress the area setting processing from being repeatedly performed.

For instance, in the above repositioning processing, setter 141 repositions the area by moving, in the direction intersecting the longitudinal direction of the joint, the area that has been determined by first determiner 142 as the area including the joint between the two first materials.

When for instance the material is an interior material, the joint tends to be a straight line. The area that has been determined as the area including the joint is repositioned by moving the area in the direction intersecting the longitudinal direction of the joint, which facilitates setting an area without a joint.

For instance, by performing the processing for detecting a straight line from the image, first determiner 142 determines whether the image includes the joint between the two first materials.

As described above, when for instance the material is an interior material, the joint tends to be a straight line. By performing the above processing, it is possible to accurately detect the joint in the image.

For instance, first determiner 142 determines whether each of the one or more areas includes the joint between the two first materials, by using the second discriminative model that receives input on the one or more areas in the image and outputs joint information indicating whether each of the one or more areas includes the joint between the two first materials, the second discriminative model being created on the basis of the first learning images and second learning images, the second learning images being images of different types of materials including the first material, and each including a joint between two materials.

Thus, a joint in the image can be detected further accurately.

For instance, the materials are interior materials installed in a building.

As described above, when for instance a material is an interior material, the joint tends to be a straight line. Thus, for instance, in a case where the material is identified using a straight line (a joint) in an image, if the materials are interior materials installed in a building, the type of the material can be identified especially accurately.

For instance, image identification device 10 further includes display 130 that displays an image showing the type of the first material indicated in the type information output by identifier 144.

For instance, by checking display 130, the user using image identification device 10 can readily identify the type of the first material.

In addition, an image identification method according to the embodiment executed by a computer, such as image identification device 10, includes obtaining an image including a first material (S101), setting one or more areas in the image (S102), determining whether each of the one or more areas in the image includes a joint between two first materials (S103), identifying the type of the first material by using a first discriminative model and outputting type information indicating the type of the first material, the type of the first material being identified by the first discriminative model receiving input on an area that has been determined as an area without the joint between the two first materials, out of the one or more areas in the image, the first discriminative model being created on the basis of the first learning images that are images of different types of materials including the first material, the first learning images being images without a joint between two materials (S105).

The image identification method can provide advantageous effects similar to those provided by image identification device 10 according to one aspect of the present disclosure.

Other Embodiments

Although the embodiment is described above, the present disclosure is not limited to the descriptions in the embodiment.

Thus, the structural elements included in the appended drawings and the detailed descriptions may include not only structural elements essential to address the technical problem, but also structural elements not essential to address the problem but used to exemplify the above-described technique. Those non-essential structural elements being included in the appended drawings and the detailed descriptions should therefore not be interpreted as meaning that the non-essential structural elements are essential to address the problem.

For instance, image identification device 10 does not have to include operation acceptor 120.

For instance, image identification device 10 does not have to include second determiner 143. In this case, for instance, after performing step S103, image identification device 10 may perform step S105, using an area without a joint.

For instance, image identification device 10 may further include a trainer (processor) used for training the discriminative model. In this case, the above-mentioned labeled training data may be stored in storage 150.

In addition, in the embodiment, the image identification device is embodied as a single device. However, the image identification device may be embodied as two or more devices. When the image identification device is embodied as two or more devices, it does not matter how the structural elements of the image identification device described in the embodiment are allocated to the two or more devices.

For instance, the image identification device may be embodied as a client server system. In this case, a client server device is a portable terminal that, for example, obtains an image, accepts a user operation, and displays the result of determination. A server device is an information terminal that performs information processing using an image, including feature amount matching processing. In addition, the image identification device may be embodied as a robotic terminal capable of traveling inside a building.

In the above embodiment, processing performed by a particular processor may be performed by another processor. The order of processing steps may be changed, and some processing steps may be performed in parallel.

In addition, in the above embodiment, each structural element (each processor) may be caused to function by executing a software program suitable for the structural element. Each structural element may be caused to function by a program executor, such as a central processing unit (CPU) or a processor, reading and executing the software program stored in a recording medium, such as a hard disk or semiconductor memory.

In addition, each structural element may be embodied as hardware. Each structural element may be a circuit (or an integrated circuit). These circuits may constitute one circuit as their entirety or individual circuits. These circuits may be general circuits or dedicated circuits.

In addition, these general or specific aspects of the present disclosure may be achieved as a system, a device, a method, an integrated circuit, a computer program, or a non-transitory computer-readable recording medium, such as a CD-ROM, or by any given combination thereof.

For instance, the present disclosure may be achieved as the image identification method executed by a computer, such as the image identification device. In addition, the present disclosure may be achieved as a program for causing the computer to execute the image identification method and as a non-transitory computer-readable recording medium in which such a program is stored.

It should be noted that the present disclosure includes one or more embodiments obtained by making various changes conceived by those skilled in the art to the embodiment or one or more embodiments obtained from any combination, within the scope of the present disclosure, of the structural elements and the functions described in the embodiment.

INDUSTRIAL APPLICABILITY

The present disclosure is useful as, for example, an image identification device, an image identification method, and a program that are capable of accurately identifying the type of a material included in an image.

The invention claimed is:

1. An image identification device comprising:
    an image obtainer that obtains an image including a first material;
    a setter that sets one or more areas in the image;
    a first determiner that determines whether each of the one or more areas in the image includes a joint between two first materials each of which is the first material; and
    an identifier that identifies a type of the first material by using a first discriminative model and outputs type information indicating the type of the first material, the type of the first material being identified by the first discriminative model receiving input on a first area that has been determined by the first determiner as an area without the joint between the two first materials, out of the one or more areas in the image, the first discriminative model being created based on first learning images that are images of different types of materials including the first material, the first learning images being images without a joint.

2. The image identification device according to claim 1, further comprising:
    a second determiner that determines whether a total number of first areas that have been determined by the first determiner as areas without the joint between the two first materials, out of the one or more areas, is greater than or equal to a predetermined number,
    wherein when the second determiner determines that the total number of the first areas is less than the predetermined number, the setter further sets an area that is at least partially different from each of the one or more areas, and
    the first determiner further determines whether the area further set by the setter includes the joint between the two first materials.

3. The image identification device according to claim 1, wherein the setter further repositions a second area to a third area that is at least partially different from the second area, the second area being an area that has been determined by the first determiner as an area including the joint between the two first materials, out of the one or more areas, and
    the first determiner further determines whether the third area to which the second area has been repositioned by the setter includes the joint between the two first materials.

4. The image identification device according to claim 3, wherein the setter repositions the second area to the third area, based on a position of the joint between the two first materials.

5. The image identification device according to claim 3, wherein the setter repositions the second area to the third area by moving the second area in a direction intersecting a longitudinal direction of the joint, the second area being the area that has been determined by the first determiner as the area including the joint between the two first materials.

6. The image identification device according to claim 1, wherein the first determiner determines whether the image includes the joint between the two first materials, by performing processing for detecting a straight line from the image.

7. The image identification device according to claim 1, wherein the first determiner determines whether each of the one or more areas in the image includes the joint between the two first materials, by using a second discriminative model that receives input on the one or more areas and outputs joint information indicating whether each of the one or more areas includes the joint between the two first materials, the second discriminative model being created based on the first learning images and second learning images, the second learning images being images of different types of materials including the first material, and each including a joint.

8. The image identification device according to claim 1, wherein the materials are interior materials installed in a building.

9. The image identification device according to claim 1, further comprising:
a display that displays an image showing the type of the first material indicated in the type information output by the identifier.

10. An image identification method comprising:
obtaining an image including a first material;
setting one or more areas in the image;
determining whether each of the one or more areas in the image includes a joint between two first materials each of which is the first material; and
identifying a type of the first material by using a first discriminative model, and outputting type information indicating the type of the first material, the type of the first material being identified by the first discriminative model receiving input on a first area that has been determined as an area without the joint between the two first materials, out of the one or more areas in the image, the first discriminative model being created based on first learning images that are images of different types of materials including the first material, the first learning images being images without a joint.

11. A non-transitory computer-readable recording medium having recorded thereon a program for causing a computer to execute the image identification method according to claim 10.

* * * * *